R. G. FULCHER & J. STIRLING.
ATTACHMENT TO PLOW STOCK.
APPLICATION FILED NOV. 27, 1914.
1,226,965.
Patented May 22, 1917.
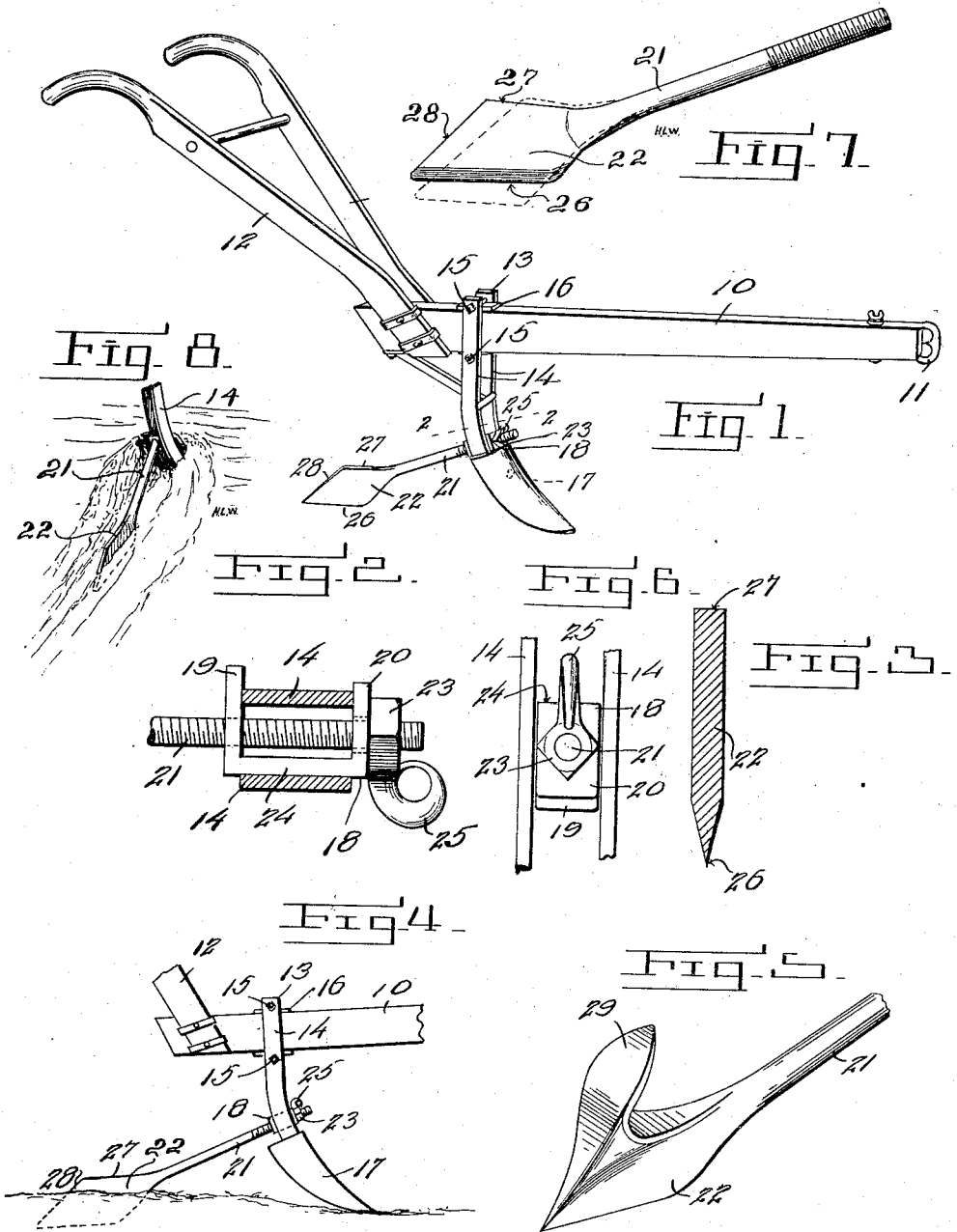

UNITED STATES PATENT OFFICE.

ROY GORDON FULCHER AND JOHN STIRLING, OF CARSON, LOUISIANA.

ATTACHMENT TO PLOW-STOCKS.

1,226,965.  Specification of Letters Patent.  Patented May 22, 1917.

Application filed November 27, 1914. Serial No. 874,336.

*To all whom it may concern:*

Be it known that we, ROY GORDON FULCHER and JOHN STIRLING, citizens of the United States, residing at Carson, in the parish of Beauregard, State of Louisiana, have invented new and useful Improvements in Attachments to Plow-Stocks, of which the following is a specification.

The invention has for an object to give a device readily attachable and detachable, for use with plows, whereby efficiency of the plows and the ease of their manipulation may be increased. It is an important aim to give such an appliance which will steady the plow and tend to hold it on a perfectly straight course, so that the plowman will not be under constant strain in making a straight furrow. Another important aim is to give such a device which, in addition to facilitating the regulation of the depth of plowing at will, will hold the plow upright in proper position whether the plow points be in or out of the ground. This is of especial advantage when the plow is not in service, as it prevents the plow from falling over and damaging the handles or other parts. Aside from the fact that the handles would become damaged and spoiled from the abrasion, breakage and contact with earth at times, it is a fact, that handles of many plows become rotted by lying upon their sides upon the ground for a lengthy period, as is often necessary with the ordinary construction of plow.

Our device has somewhat the function of a rudder, and by its use, it has been found possible to plow very close to bedded roads and delicate plants without damage thereto, and with great ease, the safety of this operation being greatly increased by the use of our invention. Furthermore, the plowman is not fatigued as much when using our invention as when using plows not so equipped, and in consequence, a larger amount of work may be done, owing to the absence of causes which might otherwise occur, in addition to which the plow may be driven at a more rapid rate of speed, without sacrifice of efficiency.

In the drawings forming a part of this application,

Figure 1 is a side view of a plow equipped with our invention,

Fig. 2 is a detail section on the line 2—2 of Fig. 1.

Fig. 3 is a cross section of the blade.

Fig. 4 illustrates the use of the device to support a plow not in use.

Fig. 5 is a detail of a modification of the blade element.

Fig. 6 is a rear view of the structure shown in Fig. 2.

Fig. 7 is a detail of the blade shown in Fig. 1.

Fig. 8 is a perspective view of the invention in use.

In the present instance the attachment is shown applied to what is known in the trade as the "Georgia plow stock", although it will be readily appreciated that the device is readily applicable to various other plow stocks. The drawing shows a simple beam 10 having the clevis 11 at the forward end, and handles 12 of ordinary form attached to the rear end of the beam. A short distance forwardly of the point of attachment of the handles the plow stock 13 is mounted on the beam. This stock comprises two light bars 14 having upper vertical portions secured against respective sides of the beam by means of bolts 15 engaged through the two bars, preferably above and below the beam, suitable wear plates 16 being interposed between the bolts and the upper and lower surfaces of the beam. The lower parts of the bars are curved forwardly at a suitable angle for proper support for a plow. A shovel plow 17 is shown attached thereto in the customary way.

Engaged with the stock 13 a short distance above the plow there is an attaching yoke 18, including parallel arms 19 and 20 the front arm shorter than the rear one between which one side of the stock is clamped, as will be explained. The rear arm 19 is formed with a threaded opening in which there is engaged the threaded forward end of the shank 21 of a blade member 22, this threaded part being extended slidably through a suitable opening in the front arm 20 and engaged with a clamping nut 23 outwardly of the yoke, by which the ends of the arms of the yoke are drawn slightly inward toward each other. The yoke is made of a piece of strap steel having a width corresponding to or slightly less than the distance between the bars 14 of the stock. The end portions of this yoke are bent at right angles to the central part, leaving a space therebetween corresponding to the major transverse dimension of the bars 14, which dimension is in a plane nearly parallel to the beam 10. The arms 19 and 20 have a length greater than their width. Thus, by extending the arms longitudinally with respect to the bars 14 while the yoke is presented therebetween, it may be readily adjusted with the back portion 24 between the bars 14, and by a quarter turn of the yoke the arms may be engaged outwardly of respective edges of one of the bars, with the back portion resting snugly against the inner side of the opposite bar. This adjustment may be accomplished while the shank is engaged with the yoke. A nut 23 is screwed on the shank outwardly of the yoke, and screwed against the yoke to secure the device in place as indicated. The nut 23 is provided with a hand grip 25, by which its manipulation is facilitated, permitting the device to be tightened or loosened in the field without the use of tools. The blade as illustrated in Figs. 1 to 3 is formed from suitable steel, and formed with a lower sharpened rectilinear edge 26 extending obliquely with respect to the shank 22, the rear part of the blade being projected across the axis of the shank a short distance. It is intended to engage and cut into earth behind the plow. The forward cutting edge portion is set some distance below the line of the shank, while the rear end thereof terminates above the axis of the shank when the device is adjusted in the position illustrated in Fig. 1. The blade is oblong, in practice being made with a vertical dimension of about three inches, and a length of five or six inches, although these dimensions are not arbitrary, and it may be found desirable to vary them to suit different requirements of use. The blade is formed with a flattened back edge 27 and a flattened edge 28, the latter extending diagonally upwardly and forwardly from the rear end of the edge 26 to the back edge 27, in the position shown in Figs. 1 and 7. It will be seen that by giving the device a half turn from the position described so as to present the edge 28 downwardly, the edge 28 will have a relation to the horizontal corresponding to that of the edge 26 before the device is turned, but offset somewhat farther below the axis of the shank. The sharp edge 26 may also be adjusted to a higher or a lower level by rotating the shank in the yoke and nut at its forward end, the shank having a downward inclination toward the rear, by which this result is attained. The part of the stock 13 with which the yoke is engaged is disposed at such inclination that the shank 22 in extending at right angles thereto will incline downwardly toward the rear at a sufficient angle to bring the blade into proper engagement with the soil in the furrow behind the plow, when in use; or engaged in the surface when the plow is resting thereon. In some forms of the device the blade may be provided with an extension 29 disposed at an angle to the back so that it will extend downwardly when the back is adjusted at the lower side of the blade, this extension operating as a subsoiler. This detail is illustrated in Fig. 5. It will be noted that the edge 26 is curved upwardly at the forward part. The angular relation of this edge to the axis of the shank 22 with consequent variations in the curved forward part of the blade may be made to suit the attachments to work with different plows or soils. It will be noted that when the back of the blade is adjusted downwardly the tendency of the blade will be to ride higher in the soil, so that a heavier plow may be supported, or a light plow caused to operate at a shallow depth.

In the use of the device, the engagement of the blade in the soil serves to prevent abrupt lateral movements of the plow and permits more positive guidance thereof by reason of its great resistance to lateral movement in the soil, affording a satisfactory fulcrum for lateral leverage exerted through the handles. It is found that at the same time it operates to regulate the depth of plowing uniformly, without liability of abrupt variations from the mean level or depth at which it is desired that the plow shall operate. It permits the plow to be raised by downward pressure on the handles as customary, but requires much less movement than customary and also obviates the necessity for lifting the plow as ordinarily customary with shovel plows, which cannot be guided in the same way as a plow with a land side.

By the construction presented, it will be seen that by loosening the nut 25 the shank 21 may be rotated in the mounting as desired to present various parts of the blade downwardly for engagement with the soil, alternatively. It is not necessary that the nuts 25 should be so loosened as to allow the yoke 18 to become loose upon the stock, and slight loosening of the nut will be sufficient to permit the shank of the blade to be turned as desired.

What is claimed is:

1. A device of the class described comprising a blade, a threaded shank thereon, a supporting yoke having clamping arms constructed for engagement with a plow stock, said shank being slidably engaged through one arm and threaded in the other, and a clamping nut on the shank outwardly of the first mentioned arm of the yoke.

2. A device of the class described comprising a blade, a shank thereon extended diagonally from the blade, a support therefor, said shank being revoluble in the support on an axis inclined downwardly to the rear and means to adjust the shank longitudinally in the support.

3. A device of the class described comprising a blade member, a shank, means for attaching the shank to a plow for positioning of the blade as described, said blade having a sharp lower edge for engagement in the ground to guide and steady a plow in its forward movement against abrupt lateral diversions and for supporting the plow in erect position, and having also flattened upper edges, said blade being revoluble for inversion at times, and means to secure the shank in adjusted positions.

4. A device of the class described comprising a blade member, a shank extended diagonally from the blade, said blade extending more beyond one side of the shank than the other, means for attaching the shank revolubly to a plow on an inclined axis for positioning of the blade as described, said blade having a sharp edge for engagement in the ground to guide and steady a plow in its forward movement against abrupt lateral divisions and for supporting the plow in erect position.

ROY GORDON FULCHER.
JOHN STIRLING.

Witnesses:
 THOMAS AULD COXON,
 JAMES T. HARDING,
 HERBERT LEON VISART.

Copies of this patent may be obtained for five cents each, by addressing the "Commissioner of Patents, Washington, D. C."